March 30, 1965 L. A. CADMUS 3,175,742
SPARE TIRE CARRIER
Filed Nov. 27, 1962 2 Sheets-Sheet 2
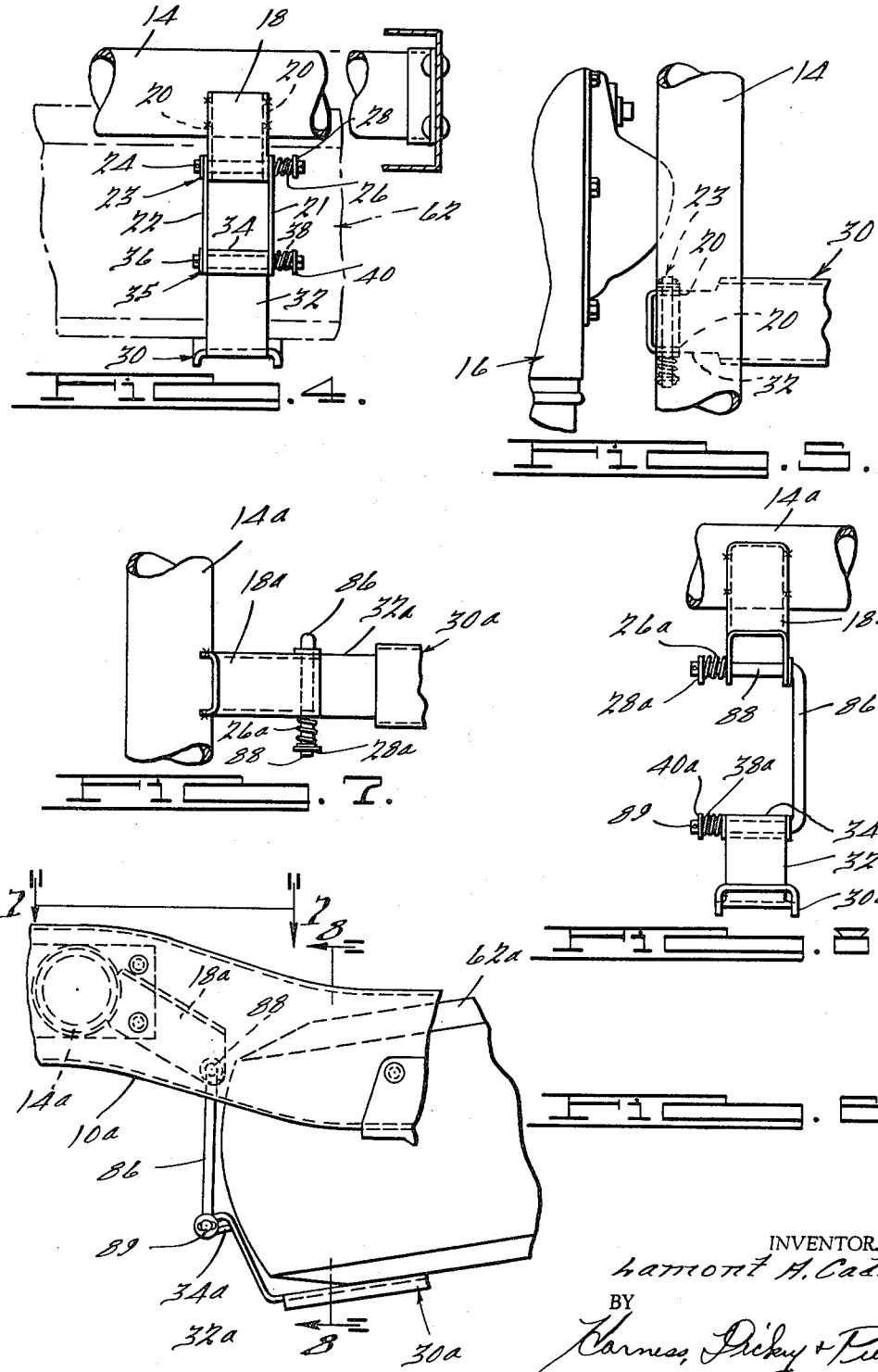
INVENTOR.
Lamont A. Cadmus
BY
Harness, Dickey & Pierce
ATTORNEYS

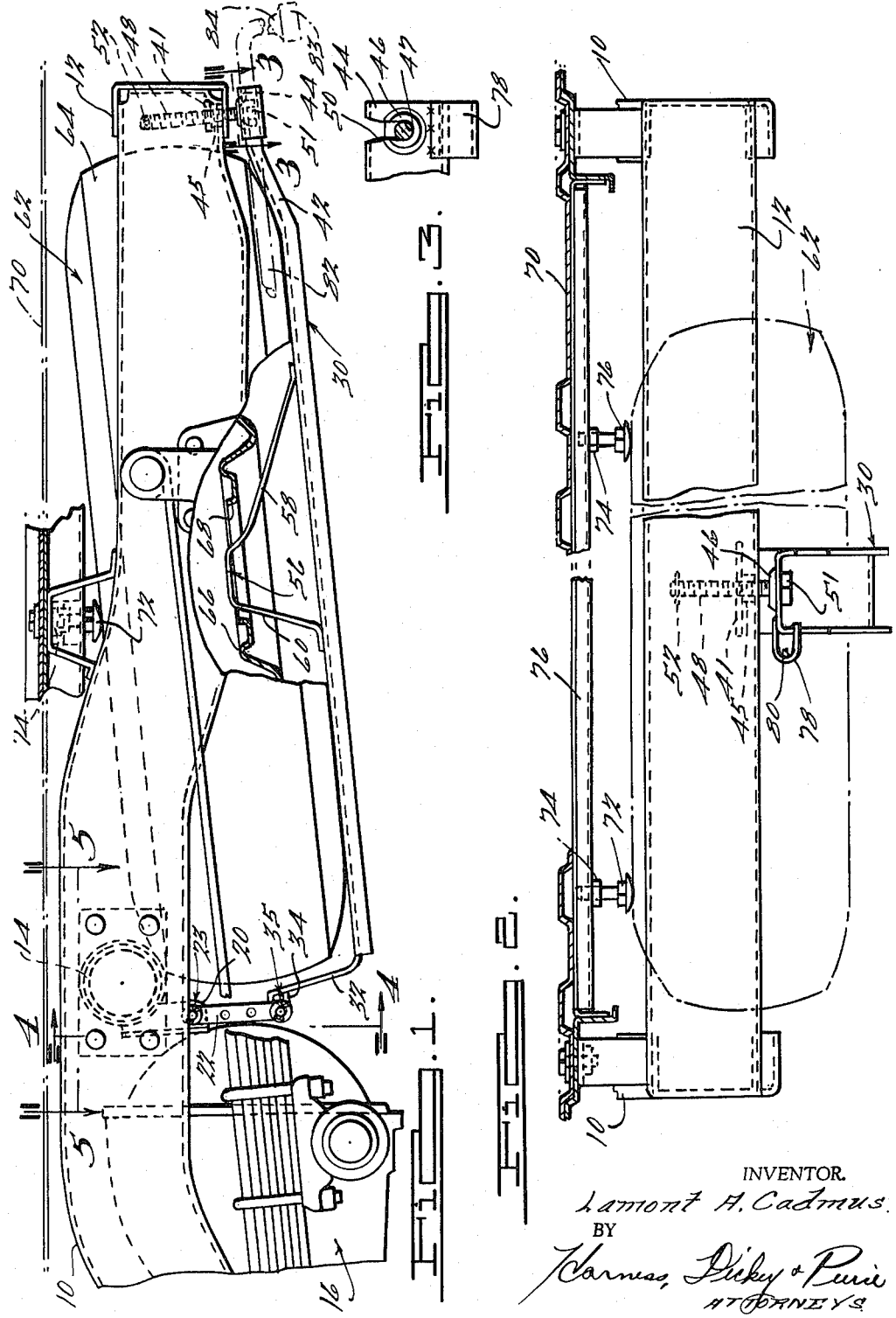

United States Patent Office 3,175,742
Patented Mar. 30, 1965

3,175,742
SPARE TIRE CARRIER
Lamont A. Cadmus, Toledo, Ohio, assignor to Kaiser Jeep Corporation, a corporation of Nevada
Filed Nov. 27, 1962, Ser. No. 240,332
14 Claims. (Cl. 224—42.23)

This invention relates to spare tire carriers for automotive vehicles.

It is desirable that a spare tire be located in an area of the vehicle which is normally not utilized, thus providing a vehicle having a maximum space for passengers and luggage. It is an object of this invention, then, to provide a novel spare tire carrier for mounting the spare tire of a vehicle in a normally nonfunctional area.

It is desirable that, in order to conserve passenger and luggage space in an automotive vehicle, the spare tire be located outside the passenger or luggage compartment. It is an object of this invention to provide a novel spare tire carrier for mounting a spare tire to the underside of a vehicle.

Other objects, features, and advantages of the present invention will become apparent from the subsequent description and the appended claims, taken in conjunction with the accompanying drawings, in which:

FIGURE 1 is a side elevational view with some parts shown broken away and others in section of a spare tire carrier embodying the features of this invention and shown in assembly relationship with a portion of a vehicle chassis;

FIGURE 2 is a rear elevational view of the assembly shown in FIGURE 1;

FIGURE 3 is a sectional view of the assembly of FIGURE 1 taken substantially along the line 3—3 of FIGURE 1;

FIG. 4 is a sectional view of the assembly shown in FIGURE 1 taken substantially along the line 4—4 in FIGURE 1;

FIGURE 5 is a sectional view of the assembly shown in FIGURE 1 taken substantially along the line 5—5 in FIGURE 1;

FIGURE 6 is a fragmentary view showing a modification of the spare tire carrier of FIGURE 1;

FIGURE 7 is a sectional view of the modified assembly shown in FIGURE 6 taken substantially along the line 7—7 in FIGURE 6; and FIGURE 8 is a sectional view of the assembly shown in FIGURE 6 taken substantially along the line 8—8 in FIGURE 6.

Looking now to FIGURE 1, a fragmentary view is shown of the rear portion of a vehicle having a pair of longitudinally extending side rails 10 which are connected at their rearward extremities by a transversely extending U-channel member 12 and connected at a point forward of the member 12 by a tubular cross member 14. The vehicle can be provided with a conventional rear axle assembly 16 which includes a pair of leaf springs, a rear axle and differential assembly, etc.

The tubular cross member 14 has a downwardly extending U-shaped channel member 18 (FIGURE 4) secured at its forward side by welding or other means. The channel member 18 has a pair of parallelly extending flange portions 20 provided with pairs of aligned bores serving a purpose to be presently seen. A pair of straps 21 and 22 are disposed proximate the outer surfaces of the flanges 20 and are pivotally held to the channel member 18 by means of a pin assembly 23 which includes a pin member 24 extending through a pair of aligned bores in flange portions 20 and through aligned bores in straps 21, 22 and having a head in engagement with the strap 22 and a coil spring 26 compressively preloaded between the strap 21 and a washer and cotter pin assembly 28. Thus the straps 21, 22 are free to pivot about the pin 24 and extend downwardly therefrom.

A longitudinally extending bar member 30 is generally of a U-shaped channel construction having at its forward end a generally upwardly extending nonflanged portion 32 terminating in an eye portion 34. The eye portion 34 does not define a circular aperture but rather an elongated, longitudinally extending aperture which serves a purpose to be seen. The eye portion 34 is pivotally supported between the straps 21, 22 by means of a second pin assembly 35 which comprises a pin 36 extending through the eye portion 34 and through aligned bores in straps 21, 22 and which has a head in engagement with the outer surface of the strap 22 and a spring member 38 compressively preloaded between the outer surface of the strap 21 and against a washer and cotter pin assembly 40.

The bar 30 can be pivoted laterally about the pin 36 as a result of the celarance between the elongated aperture of eye portion 34 and the round pin 36. Looking at FIGURE 4, the straps 21 and 22 aid the longitudinally extending bar 30 to be pivoted laterally. The springs 26 and 38 keep the pins 24 and 36 from interfering with the axle housing cover (see FIGURE 5) in full jounce position and also keep the pins 24, 26 from rattling. The bar 30 at its rearward end has a portion 42 sloping slightly upwardly and terminates in a generally longitudinally extending portion 44. The portion 44 is provided with an upwardly extending indentation 46 (see FIGURE 3) having a bore 47 in a center thereof and is also provided with a slot 50 extending transversely from one end of the portion 44 of the bar 30 and into communication with the bore 47 for a purpose to be described. The rear U-shaped channel member 12 supports at its lower flange a nut 45 which is welded to a small plate 41, which nut 45 threadably receives a bolt member 48. While the plate 41 keeps the nut 45 from rotating because of contact with the web portion of channel 12, the nut 45 and plate 41 can rock, allowing alignment as the bolt 48 is threaded into the nut 45. The bolt member 48 is provided with a head portion 51 at one end and has a cotter pin 52 extending through the threaded end to prevent the bolt 48 from completely unthreading out of the nut 45. The indention 46 at the end portion 44 of the bar 30 is of a shape to partially matably receive the head 51 of the bolt 48. Likewise, the bore 47 is of a size sufficient to receive the shank of the bolt 48 and the slot 50 is large enoung to allow the shank of the bolt 48 to pass therethrough. Thus, in assembly the bar 30 can be moved upwardly aligning the slot 50 with the shank of the bolt 48 and then moved transversely such that the shank of the bolt 48 is moved through the slot 50 and is disposed within the bore 47. As the bar 30 is released it cannot be removed from the bolt 48, since the head portion 51 of the bolt 48 is then securely seated within the identation 46; to remove the bar 30 it must again be lifted upwardly, moving the identation 46 free of the head portion 51, thereby allowing the bar 30 to be moved transversely via the slot 50 away form the bolt 48. The links 21, 22 allow pivotal movement of the bar 30 in either direction laterally and thereby facilitate its assembly on and off the head portion 51 of the bolt 48.

Approximately centrally of the bar 30 is secured an upwardly extending bracket 56 provided at its rearward end with a gradually inclined portion 58 and at its forward end with an abruptly rising portion 60.

A wheel assembly 62 includes a tire member 64 which is disposed upon an annular rim member 66. The rim 66 is provided with a central aperture 68 which, with the wheel assembly 62 disposed upon bar 30, extends peripherally about the upwardly extending bracket 56. Thus, with the bar 30 in its uppermost position as secured to the bolt 48, longitudinal and transverse movement of the tire assembly 62 is limited by means of the engagement of the periphery of the aperture 68 of the rim 66 with the bracket 56.

In order to provide that the tire assembly 62 be maintained vertically securely to the underside of the vehicle, a pair of round head bolts 72 are threaded to a pair of nuts 74 which are welded or otherwise secured to the bottom of a floor pan 70. The bolts 72 are threaded into the nut 74 sufficient such that, as the bar 30 is moved to its upper postion, the tire 64 is moved into contact with the round head portions of the bolts 72; thus wheel assembly 62 is clamped to the vehicle by the bar 30 and bolts 72. A transversely extending, reinforcing flanged member 76 is located in the area of the bolts 72 to stiffen the floor pan 70 to prevent localized buckling or oil-canning due to the inertia loads on the tire assembly 62.

The U-channel bracket 18, as previously mentioned, is provided with a pair of holes extending through the flanges thereof whereby the straps 21, 22 can be mounted further vertically upwardly if desired to accommodate a tire of a different size. The longitudinally extending end portion 44 of the bar 30 has secured thereto a U-shaped bracket 78 which defines an aperture or hollow 80. Aperture 80 is of a size sufficient to accept the straight portion 82 of a wheel nut wrench 84 (shown in phantom). This allows the bar 30 to be more easily manipulated by virtue of the lever arm provided by the tire iron 84. The head portion 51 of bolt 48 is provided to be the same size and contour as the socket portion 83 of the wheel nut wrench or tire iron 84, thus allowing the tire iron to be used to tighten or loosen the bolt 48 in nut 45 in removing or replacing wheel assembly 62.

The bracket 56 is provided with the gradually inclining portion 58 to facilitate assembly of wheel assembly 62 upon the bar 30. Thus, with the bar 30 in its lowermost position, the tire assembly 62 can be readily mounted upon the bar 30 with the aperture 68 disposed about the bracket 56 by sliding the tire 62 up the inclined surface of the inclined portion 58. The bar 30 with the tire assembly 62 thereon can be easily mounted to the bolt 48 simply by inserting the tire iron 84 into the aperture 80, lifting the bar 30 upwardly and slightly transversely until the slot 50 is in alignment with the shank of the bolt 48, and moving the bar 30 oppositely transversely until the shank of the bolt 48 is located in the bore 47. With the tire iron 84 removed, the weight of the tire assembly 62 moves the bar 30 downwardly, moving the indentation 46 into engagement with the head portion 51. The tire assembly 62 can be further secured by threading the bolt 48 further into the nut 46 by means of the socket portion 83 of the tire iron 84.

For larger tires, a modified construction is shown in FIGURES 6, 7 and 8. In FIGURES 6, 7 and 8, components similar to the components of the embodiment of FIGURES 1–5 and serving similar functions are provided with the same numerals with the addition of a letter subscript. Looking now to FIGURE 6, a bar 30a terminates in an eye portion 34a having an elongated aperture and is utilized to clamp a tire assembly 62a to the vehicle. A U-channel bracket 18a is attached to the rearward portion of a tubular cross member 14a and has two pairs of aligned apertures extending through its parallel flanges. A U-shaped intermediate member 86 has a pair of transversely extending leg portions 88, 89 with leg portion 88 being disposed in and extending through the eye portion 34a of the bar 30a and with the leg portion 89 being disposed in and extending through one of the pair of aligned bores in the flanges of the U-shaped bracket 18a. Spring members 26a and 38a are disposed on the outer extremities of leg portions 88 and 89, respectively. The spring 26a is maintained under a compressive preload between a washer and cotter pin assembly 28a attached at the end of a leg portion 88 and one flange of the bracket 18a. The spring 38a is maintained under a compressive preload between a washer and cotter pin assembly 40a attached at the end of the leg portion 89 and the eye portion 34a. Both springs 26a and 38a urge the intermediate member 86 in the same transverse direction and prevent rattling. The bar 30a can be moved pivotally laterally in the same manner as bar 30 to facilitate assembly and disassembly of the tire assembly 62a.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an automative vehicle having a plurality of wheels and a wheel nut wrench having a straight portion at one end terminating in a socket portion at its opposite end, the combination including a tire carrier assembly for mounting a wheel assembly to a vehicle, said tire carrier assembly comprising a longitudinally extending bar member engageable with the wheel assembly whereby the wheel assembly can be clamped to the vehicle, means securing one end of said bar member to the vehicle for up and down swinging movement and for lateral pivotal movement, said bar member having an indentation at its opposite end, said indentation having a centrally disposed bore in communication with a transversely extending through slot, said bar member having a hollow at said opposite end for receiving the straight portion of the wrench whereby manipulation of said bar member is facilitated, and a bolt member threadably engageable with the vehicle at a point proximate said opposite end of said bar member and having a shank portion movable through said slot and an enlarged head portion matably disposable in the cavity of said indentation with said head portion shaped to be gripped by the socket portion of the wrench.

2. A tire carrier assembly for mounting a wheel assembly to a vehicle comprising a longitudinally extending bar member engageable with the wheel assembly whereby the wheel assembly can be clamped to the vehicle, means pivotally securing one end of said bar member to the vehicle for up and down swinging movement, said means including means for permitting lateral pivotal movement and for resiliently resisting transverse movement of said bar member, and support means secured to the vehicle for removably supporting the opposite end of said bar member to the vehicle, said support means including a member having a shank portion terminating in an enlarged head portion, said bar member having at said opposite end a transversely extending slot for receiving said shank portion whereby said opposite end of said bar member can be supported on said enlarged head portion.

3. A tire carrier assembly for mounting a wheel assembly to a vehicle comprising a longitudinally extending bar member engageable with the wheel assembly whereby the wheel assembly can be clamped to the vehicle, said bar member having a longitudinally extending portion terminating at one end in an upwardly extending portion having an eye portion, a member depending from the vehicle and having a pair of transversely spaced surfaces, a pin member supported by said member and extending outwardly from each of said surfaces, a spring member supported at one end of said pin member for resiliently urging said pin member transversely in one direction, a pair of strap members each pivotally supported at one end on said pin member and each located adjacent one of said surfaces, a second pin member supported in said eye portion of said bar member and extending outwardly on opposite sides thereof, a second spring member supported at one end of said second pin member for resiliently urging said second pin member transversely in said one direction, each of said pair of strap members pivotally supported at opposite ends on said second pin member and each located on opposite sides of said eye portion, and means for removably securing the opposite end of said bar member to the vehicle.

4. A tire carrier assembly for mounting to a vehicle a wheel assembly having a tire and a rim with a central aperture, said tire carrier assembly comprising a longitudinally extending bar member engageable with the wheel assembly whereby the wheel assembly can be clamped to the vehicle, said bar member having a longitudinally extending portion terminating at one end in an upwardly extending portion having an eye portion, a member depending from the vehicle and having a pair of transversely spaced surfaces, a pin member supported by said member and extending outwardly from each of said surfaces, a spring member supported at one end of said pin member for resiliently urging said pin member transversely in one direction, a pair of strap members each pivotally supported at one end on said pin member and each located adjacent one of said surfaces, a second pin member supported in said eye portion of said bar member and extending outwardly on opposite sides thereof, a second spring member supported at one end of said second pin member for resiliently urging said second pin member transversely in said one direction, each of said pair of strap members pivotally supported at opposite ends on said second pin member and each located on opposite sides of said eye portion, said bar member having a bracket located between said one and said opposite ends with said bracket extending upwardly into the aperture of the rim of the tire assembly whereby lateral movement of the tire assembly relative to said bar member is limited, said bracket having a gradually upwardly inclined portion facing said opposite end of said bar member to facilitate assembly of the wheel assembly thereon, and means for removably securing the opposite end of said bar member to the vehicle.

5. A tire carrier assembly for mounting to a vehicle, a wheel assembly having a tire and a rim with a central aperture, said tire carrier assembly comprising a longitudinally extending bar member engageable with the wheel assembly whereby the wheel assembly can be clamped to the vehicle, said bar member having a longitudinally extending portion terminating at one end in an upwardly extending portion having an eye portion, a member depending from the vehicle and having a pair of transversely spaced surfaces, a pin member supported by said member and extending outwardly from each of said surfaces, a spring member supported at one end of said pin member for resiliently urging said pin member transversely in one direction, a pair of strap members each pivotally supported at one end on said pin member and each located adjacent one of said surfaces, a second pin member supported in said eye portion of said bar member and extending outwardly on opposite sides thereof, a second spring member supported at one end of said second pin member for resiliently urging said second pin member transversely in said one direction, each of said pair of strap members pivotally supported at opposite ends on said second pin member and each located on opposite sides of said eye portion, said bar member having a bracket located between said one end and said opposite ends with said bracket extending upwardly into the aperture of the rim of the tire assembly whereby lateral movement of the tire assembly relative to said bar member is limited, said bracket having a gradually upwardly inclined portion facing said opposite end of said bar member to facilitate assembly of the wheel assembly thereon, said bar member having an indentation at its opposite end, said indentation having a centrally disposed bore in communication wtih a transversely extending through slot, a bolt member threadably engageable with the vehicle at a point proximate said opposite end of said bar member and having a shank portion movable through said slot and an enlarged head portion matably disposable in the cavity of said indentation, and means for removably securing the opposite end of said bar member to the vehicle.

6. The apparatus of claim 5 further including means engageable with the wheel assembly for holding the wheel assembly out of direction contact with the floor pan of the vehicle.

7. A tire carrier assembly for mounting a wheel assembly to a vehicle comprising a longitudinally extending bar member engageable with the wheel assembly whereby the wheel assembly can be clamped to the vehicle, said bar member having a longitudinally extending portion terminating at one end in an upwardly extending portion having an eye portion, a support member secured to the vehicle, a U-shaped member having a pair of leg portions, one of said leg portions supported by said support member and extending transversely therethrough with its free end extending beyond said support member, a spring member supported at said free end of said one of said leg portions for resiliently urging said free end outwardly of said support member, the other of said leg portions supported in said eye portion of said bar member with its free end extending beyond said eye portion, a second spring member supported at said free end of said other of said leg portions for resiliently urging said free end outwardly of said eye portion, and means for removably securing the opposite end of said bar member to the vehicle.

8. A tire carrier assembly for mounting to a vehicle a wheel assembly having a tire and a rim with a central aperture, said tire carrier assembly comprising a longitudinally extending bar member engageable with the wheel assembly whereby the wheel assembly can be clamped to the vehicle, said bar member having a longitudinally extending portion terminating at one end in an upwardly extending portion having an eye portion, a support member secured to the vehicle, a U-shaped member having a pair of leg portions, one of said leg portions supported by said support member and extending transversely therethrough with its free end extending beyond said support member, a spring member supported at said free end of said one of said leg portions for resiliently urging said free end outwardly of said support member, the other of said leg portions supported in said eye portion of said bar member with its free end extending beyond said eye portion, a second spring member supported at said free end of said other of said leg portions for resiliently urging said free end outwardly of said eye portion, said bar member having a bracket located between said one and said opposite ends with said bracket extending upwardly into the aperture of the rim of the tire assembly whereby lateral movement of the tire assembly relative to said bar member is limited, said bracket having a gradually upwardly inclined portion facing said opposite end if said bar member to facilitate assembly of the wheel assembly thereon, and means for removably securing the opposite end of said bar member to the vehicle.

9. A tire carrier assembly for mounting to a vehicle a wheel assembly having a tire and a rim with a central aperture, said tire carrier assembly comprising a longitudinally extending bar member engagable with the wheel assembly whereby the wheel assembly can be clamped to the vehicle, said bar member having a longitudinally extending portion terminating at one end in an upwardly extending portion having an eye portion, a support member secured to the vehicle, a U-shaped member having a pair of leg portions, one of said leg portions supported by said support member and extending transversely therethrough with its free end extending beyond said support member, a spring member supported at said free end of said one of said leg portions for resiliently urging said free end outwardly of said support member, the other of said leg portions supported in said eye portion of said bar member with its free end extending beyond said eye portion, a second spring member supported at said free end of said other of said leg portions for resiliently urging said free end outwardly of said eye portion, said bar member having a bracket located between said one and said opposite ends with said bracket extending upwardly into the aperture of the rim of the tire assembly whereby lateral movement of the tire assembly relative to said bar member is limited, said bracket having a gradually upwardly inclined portion facing said opposite end of said bar member to facilitate assembly of the wheel assembly thereon, said bar member having an indentation at its opposite end, said indentation having a centrally disposed bore in communication with a transversely extending through slot, a bolt member threadably engageable with the vehicle at a point proximate said opposite end of said bar member and having a shank portion movable through said slot and an enlarged head portion matably disposable in the cavity of said indentation, and means for removably securing the opposite end of said bar member to the vehicle.

10. The apparatus of claim 9 further including means engageable with the wheel assembly for holding the wheel assembly out of direct contact with the floor pan of the vehicle.

11. A tire carrier assembly for mounting a wheel assembly to a vehicle comprising: a longitudinally extending bar member engageable with the wheel assembly whereby the wheel assembly can be clamped to the vehicle, said bar member terminating at one end in an eye portion, a support member on the vehicle, a pin member supported by said support member, a strap member pivotally supported at one end on said pin member, a second pin member supported in said eye portion of said bar member, a spring member located at one end of one of said pin members for resiliently urging said one of said pin members transversely in one direction, and means for removably securing the opposite end of said bar member to the vehicle.

12. The tire carrier assembly of claim 3 further including a second strap member pivotally supported at opposite ends on said pin members and a second spring member located at one end of the other of said pin members for urging said other of said pin members transversely in said one direction, said eye portion defining a longitudinally elongated aperture.

13. A tire carrier assembly for mounting a wheel assembly to a vehicle comprising a longitudinally extending bar member engageable with the wheel assembly whereby the wheel assembly can be clamped to the vehicle, said bar member terminating in one end in an eye portion, a support member secured to the vehicle, a U-shaped member having a pair of leg portions, one of said leg portions supported by said support member extending transversely therethrough with its free end extending beyond said support member, the other of said leg portions supported in said eye portion of said bar member with its free end extending beyond said eye portion, a spring member supported at said free end of one of said leg portions for resiliently urging said free end outwardly, and means for removably securing the opposite end of said bar member to the vehicle.

14. The tire assembly of claim 13 further including a second spring member located at one end of the other of said leg portions for urging said other of said leg portions transversely in said one direction, said eye portion defining a longitudinally elongated aperture.

References Cited by the Examiner

UNITED STATES PATENTS

| | | | |
|---|---|---|---|
| 2,645,394 | 7/53 | De Boro | 214—454 |
| 2,679,961 | 6/54 | Brewer | 214—454 |
| 2,777,591 | 1/57 | Manzatuik | 214—451 |

FOREIGN PATENTS 784,718  10/57  Great Britain.

HUGO O. SCHULZ, *Primary Examiner.*

UNITED STATES PATENT OFFICE
CERTIFICATE OF CORRECTION

Patent No. 3,175,742 March 30, 1965

Lamont A. Cadmus

It is hereby certified that error appears in the above numbered patent requiring correction and that the said Letters Patent should read as corrected below.

Column 1, line 27, after "others" insert -- shown --; line 61, for "is" read -- its --; column 2, line 18, for "celarance" read -- clearance --; line 24, for "26" read -- 36 --; line 47, for "enoung" read -- enough --; lines 54 and 56, for "identation", each occurrence, read -- indentation --; same column 2, line 58, for "form" read -- from --; column 3, line 9, for "sufficient" read -- sufficiently --; line 10, for "postion" read -- position --; column 5, line 73, for "oppoiste" read -- opposite --; column 6, line 1, for "direction" read -- direct --; line 50, for "if" read -- of --.

Signed and sealed this 24th day of August 1965.

(SEAL)
Attest:

ERNEST W. SWIDER
Attesting Officer

EDWARD J. BRENNER
Commissioner of Patents